Figure 1:
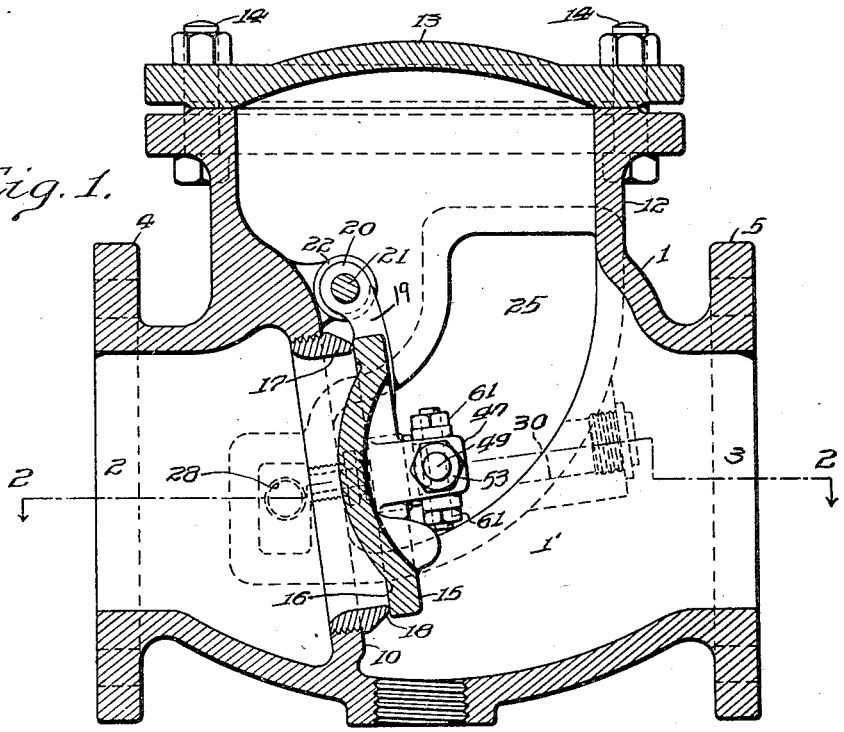

Nov. 4, 1924.

L. M. LEWIS

ALARM CHECK VALVE

Filed March 25, 1922 — 2 Sheets-Sheet 1

1,514,090

WITNESS
F. J. Hartman

INVENTOR
Leroy M. Lewis.
BY Blount, Moulton & Hilbert
ATTORNEYS

Nov. 4, 1924.  
L. M. LEWIS  
ALARM CHECK VALVE  
Filed March 25, 1922    2 Sheets-Sheet 2  
1,514,090

WITNESS
F. J. Hartman

INVENTOR
Leroy M. Lewis.
BY Blount, Moulton & Hilbert
ATTORNEYS

Patented Nov. 4, 1924.

1,514,090

UNITED STATES PATENT OFFICE.

LEROY M. LEWIS, OF MERION, PENNSYLVANIA.

ALARM CHECK VALVE.

Application filed March 25, 1922. Serial No. 546,835.

*To all whom it may concern:*

Be it known that I, LEROY M. LEWIS, a citizen of the United States, and a resident of Merion, county of Montgomery, State of Pennsylvania, have invented certain new and useful Improvements in Alarm Check Valves, of which the following is a specification, reference being had to the accompanying drawing.

My invention relates to alarm check valves for automatic fire extinguishing systems of the sprinkler type and embodying an auxiliary valve adapted to control the flow of water to an alarm controlling mechanism intended to operate an alarm upon the opening of one or more of the sprinkler heads in the system, and more particularly has reference to improvements in the construction and arrangement of certain of the parts of an alarm check valve of the general type of that forming the subject of U. S. Letters Patent No. 1,385,460, granted to me on July 26, 1921.

It has been found that in the manufacture of valves of the type disclosed in said patent, it is extremely difficult to arrange the seats for the main and auxiliary valves at the proper distance from each other and in a relation such that a tight closure of their respective valve clappers will be effected on both of them, for in order to bring about this result it is requisite that the threads in the two bores in which the valve seats are screwed shall be in substantially perfect axial alignment with each other and that the axes of the bores shall be separated by a predetermined distance. This condition is very difficult to attain in practice since owing to the necessary shape of the valve casing a relatively long and light boring bar must be used for finishing the bore in which the auxiliary valve seat is positioned, after which it must be tapped out with a tap of relatively small size held on the end of a long bar or other similar instrument. Under these circumstances if a hard spot or the like is encountered in the casting, the boring bar or tap is apt to run off at an angle from the line which should be followed to produce substantially perfect parallelism with the bore and threading of the main valve seat, with the result that when the auxiliary valve seat is screwed into place, its seating face is somewhat angularly disposed with respect to the seating face of the main valve seat.

In addition to the reasons to which I have referred, it frequently happens in the manufacture of these valves that the distance between the axes of the bores for the main and auxiliary valve seats is greater or less than the theoretically proper distance therebetween with the result that when the parts are adjusted to effect proper seating of the main valve clapper, the auxiliary valve clapper is not in axial alignment with its seat.

A principal object of my invention is to provide in an alarm check valve of the general type aforesaid, means for effecting adjustment of the distance between the axes of the main and auxiliary valve clappers and, additionally, for permitting adjustment of the latter so that the plane of its seating face may be shifted with respect to the corresponding plane of the main clapper to compensate for the irregularities in relative positioning or threading of the bores in which the valve clapper seats are disposed.

A further object of my invention is to provide means suitable for purposes aforesaid which are simple in construction and arrangement; which after initial adjustment may be locked in position and which do not add materially to the cost of the valve, particularly when the saving in expense over that hitherto necessitated by the time and care required in machining the valve seat bores in an effort to bring them into proper alignment and position is taken into account.

My invention further comprehends all of the other objects and novel features of construction and arrangement hereinafter more particularly specified, described or which appear from the drawings forming a part hereof.

Figure 2:
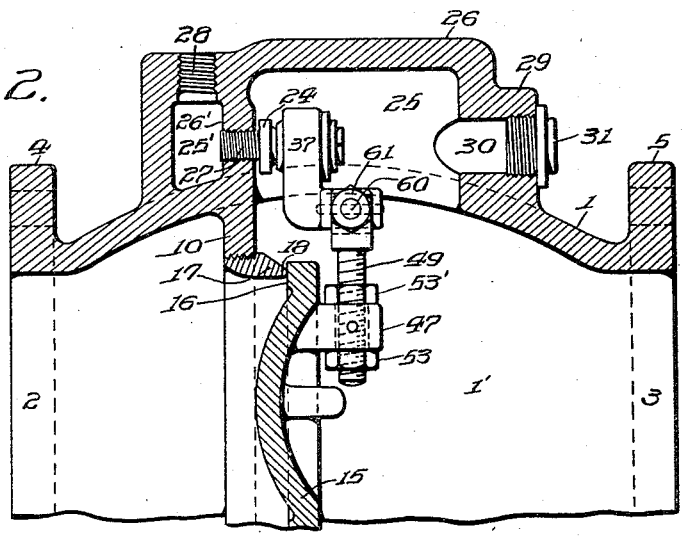
Figure 3:
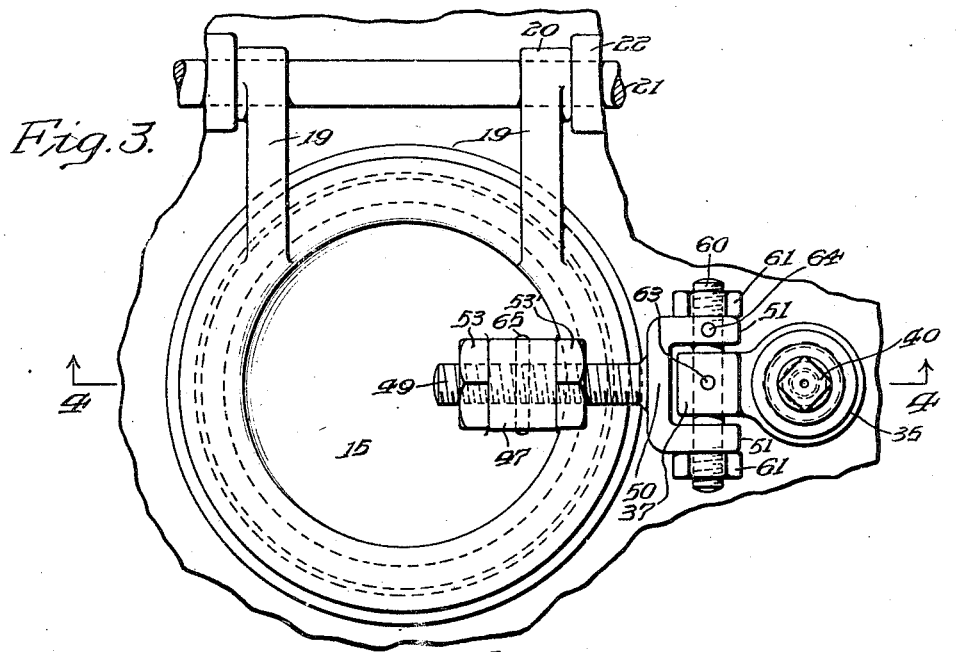
Figure 4:
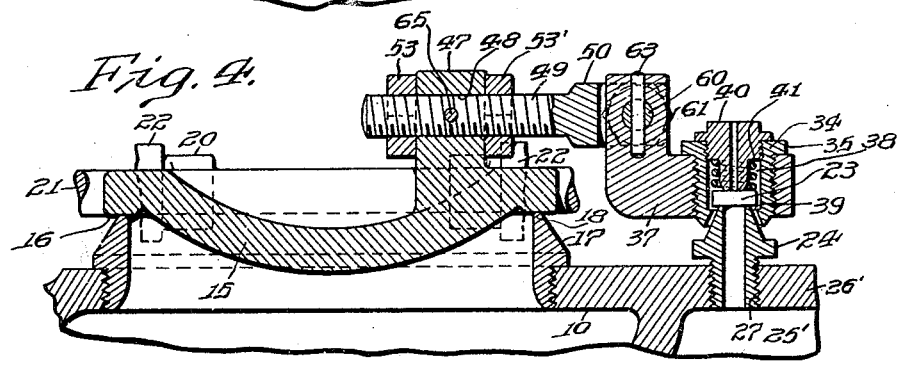
Figure 5:
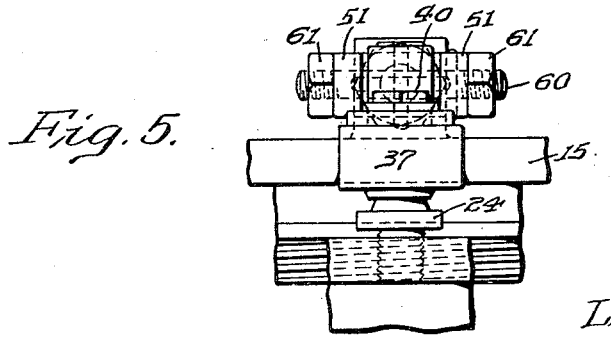

In the said drawings Fig. 1 is a vertical central section through an alarm check valve embodying a preferred form of my invention and Fig. 2 is a fragmentary transverse section on line 2—2 in Fig. 1 looking in the direction of the arrows. Fig. 3 is an enlarged, fragmentary elevation of the main valve clapper and adjacent parts, Fig. 4 is a fragmentary section on line 4—4 in Fig. 3 looking in the direction of the arrows, and Fig. 5 is a fragmentary end elevation of the auxiliary valve housing and adjacent parts. Like numerals are used to designate similar parts in the several figures.

The alarm check valve shown in the drawing comprises a hollow casing or body 1 provided at one end with a supply inlet 2 and at the other with a discharge outlet 3, both inlet and outlet being in substantially axial alignment with each other and with the chamber 1' within the casing so as to provide a direct passage for the water through the valve. The inlet and outlet are respectively provided with annular flanges 4 and 5 for the attachment of the supply and discharge pipes.

Within the casing is provided a transverse partition 10 of substantially annular form and preferably integral therewith, the inner marginal edge of the partition being preferably arranged in a plane slightly inclined with respect to a normal to the longitudinal axis of the casing, which is also provided with a laterally extending, substantially cylindrical hollow extension 12 the interior of which communicates with the chamber 1' on the outlet side of the main check valve. The mouth of this extension is normally closed by a cover 13 held in place by bolts 14.

A substantially circular main valve clapper 15 is arranged to control the opening in the partition 10, the clapper being provided on its under side with an annular marginal surface 16 adapted to seat on an annular valve seat 17 threaded into an internally threaded bore in the partition and preferably having a relatively narrow edge surface 18 to receive the clapper. The clapper is also provided with arms 19, spaced apart and projecting outwardly from the clapper substantially in the general plane thereof and in the direction of the cover 13, the end of each of these arms being enlarged to form a boss or hub 20 which is loosely and rotatably mounted on a shaft or pivot pin 21, the longitudinal axis of this shaft being conveniently substantially coincident with the plane of the edge 18 of the seat and parallel thereto. The ends of the shaft are supported in the sides of the casing, which may be provided with bosses 22 for their reception in any suitable manner but preferably in such a way that the shaft may be removed when desired.

For the purpose of giving an alarm when the main valve clapper opens for a predetermined distance, an auxiliary valve is provided having a clapper 23 conveniently in the form of a flat disk which is cooperative with a valve seat 24.

The auxiliary valve and its seat are located in a chamber or pocket 25 formed on one side of the valve casing and bounded by a suitably disposed wall 26, the chamber being in free communication with the interior of the valve casing and shaped, as best shown in Fig. 1, in such manner that when the valve clapper 15 swings to open position the auxiliary valve which is carried thereby is free to swing with it without coming into contact with the walls of the chamber.

The auxiliary valve seat 24 is conveniently in the form of a hollow bushing, one end of which is tapered or cone-shaped so as to provide a relatively narrow surface for engagement with the valve clapper; the opposite end of the bushing is exteriorly threaded and screwed into a suitably internally threaded bore 27 disposed in a partition 26' which separates the chamber 25 from a smaller chamber 25', the latter being provided with a threaded outlet aperture 28 for connection to a pipe through which the water can pass to the alarm mechanism upon the opening of the alarm check valve.

The axis of the bore 27 is preferably disposed upon a prolongation of that diameter of the main clapper 15 which is parallel to the pivot shaft 21 and at a convenient distance from the center of the main clapper, and in order to permit the drilling and threading of this bore, the opposite wall of the chamber 25 is provided with a boss 29 through which extends a cored aperture 30, closed under operative conditions by a suitable plug 31, this aperture being in substantial alignment with the axis of bore 27 and of sufficient size to permit the introduction of the necessary tools for boring and threading the latter. Obviously, however, as it is desirable to keep the overall dimensions of the valve casing as small as possible and as the external configuration of the casing is somewhat peculiar to adapt it for operative requirements and those of the Underwriters Laboratories, the size of the aperture 30 is necessarily limited and in turn the maximum size of the tools which can be inserted therethrough, while the position of the flange 5 necessitates the employment of tools of relatively great length between the point at which they are held in the chuck or other gripping device which must be disposed outside the flange and the point at which they are working, namely, the partition 26', all of which conditions make it extremely difficult, when taken in connection with the hard spots frequently encountered in the cast metal of which the partition is made, to drill and thread the bore 27 so that its axis will be parallel with that of the main seat 17 and at the theoretically proper distance therefrom.

While the auxiliary valve may be of any suitable form and construction, I prefer to support the clapper 23 in a hollow sleeve 34 externally threaded and having a flange 35 at one end adapted to seat against the surface of a housing 37 when the sleeve is screwed into place therein. Within the sleeve is a chamber 38 provided with an annular shoulder or abutment 39 adjacent its lower end upon which the valve clapper is adapted to rest in certain positions of the sleeve, while beneath the shoulder, the wall of the passage through the sleeve is flared outwardly and made of sufficient size to readily permit the entrance of the conical end of the valve seat. The upper end of the chamber within the sleeve is internally threaded to receive a plug 40, the lower end of which is adapted to contact the upper surface of the clapper and a coil spring 41 may be disposed about the lower end of the plug in such manner as to tend to force the clapper toward the shoulder 39 and thus assist in normally effecting a tight closure between the valve seat and the clapper. It will be apparent that by suitable adjustment of the plug in the sleeve, the clapper may be permitted to have a slight amount of play between the end of the plug and the shoulder; a condition which under certain circumstances is desirable in that should the main clapper be intermittently lifted from its seat for a short distance by reason of "water hammer" or other cause, the auxiliary valve clapper will nevertheless remain in seated position and prevent the functioning of the alarm.

For the purpose of compensating for any lack of parallelism between the axes of the respective valve seats when positioned in the casing or for any variation between the theoretical distance and the actual distance between these axes, I arrange the means through the medium of which the auxiliary valve is supported upon the main clapper in such manner that relative adjustment in different directions may be effected between the valve and the main clapper. Thus, I preferably provide the main clapper with an integral outwardly directed lug 47 disposed on its upper surface at any convenient point, preferably on that diameter of the clapper which, when projected, will extend substantially through the axis of the auxiliary seat and conveniently at a point about midway between the center of the main clapper and its periphery. This lug is provided with a bore 48 the axis of which extends in the general direction of the auxiliary valve seat and through which is adapted to extend the exteriorily threaded shank 49 of a member 50. This member is preferably provided at one end with a clevis 51 disposed symmetrically with respect to the shank, which latter is effective to support on opposite sides of the lug 47 a pair of adjusting nuts 53, 53', which can be drawn up against the opposite faces of the lug to securely lock the shank with respect thereto at any desired point within the limit of movement permitted by the length of the shank. The jaws of the clevis are drilled transversely to the axis of the shank for the reception of a pin 60 which projects beyond the outer faces of the jaws and is threaded for the reception of the lock nuts 61 on its projecting ends. This pin between the jaws is effective to support one arm of the substantially L-shaped housing 37, the other arm of which surrounds the auxiliary valve. Preferably the aforementioned arm is made somewhat narrower or thinner than the distance between the jaws 51 so that it may be moved laterally for a short distance between them and is suitably secured to the pin 60 preferably at its center, as by means of a pin 63 extending through the arm and pin 60.

It will be evident that with the parts constructed and arranged substantially as described, the means for supporting the auxiliary valve may be assembled on the main clapper and the auxiliary valve housing then adjusted within the clevis 51 by means of the nuts 61 until it is brought to alignment with the seat 24 while by rotating the pin in the jaws the auxiliary valve clapper may be also brought to a position in which it is at right angles to the axis of the seat, after which the lock nuts 61 may be screwed down against the outside of the jaws and if desired the pin 60 secured rigidly to the jaws by drilling through one of them and through the pin and inserting a locking pin 64. Additionally, by suitable adjustment of the shank 49 in or out with respect to the lug 47 and by suitable rotation of the shank within the lug, the axis of the auxiliary valve may be brought to coincidence with the axis of its seat and the plane of the valve at right angles to said axis, after which the lock nuts 53 are set up and the lug and shank 49 preferably drilled for the reception of a locking pin 65. Thus, even though the axis of the auxiliary valve seat when disposed in the casing is at a relatively considerable distance from the point at which it should theoretically be, or if it is out of parallelism with the axis of the main valve seat, or both, the means by which the auxiliary valve is supported from the main valve clapper may be readily adjusted when the alarm check valve is in process of assembly so as to compensate for the error, and the parts then securely locked in position thereby avoiding any possibility of relative displacement under operative conditions.

While I have described with considerable particularity and illustrated on the accompanying drawing a preferred embodiment of my invention, I do not thereby desire or intend to limit myself to any precise details of construction or arrangement of parts, as the same may be readily varied in minor particulars from those shown to better adapt the invention for use under different operative conditions or for other reasons, without departing from the spirit and scope of the invention as defined in the appended claims.

Having thus described my invention, I claim and desire to protect by Letters Patent of the United States:

1. An alarm check valve comprising a casing having inlet and outlet passages, a main valve clapper pivotally supported therein, an auxiliary valve laterally disposed with respect to the main valve and having a clapper cooperative with a valve seat operatively rigid with the casing, and means adjustable in a direction parallel to a diameter of the main valve clapper for supporting said auxiliary valve on said clapper.

2. An alarm check valve comprising a casing having inlet and outlet passages, a main valve clapper pivotally supported therein, an auxiliary valve laterally disposed with respect to the main valve and having a clapper cooperative with a valve seat operatively rigid with the casing, and means adjustable in either direction along a line parallel to a diameter of the main valve clapper and also rotatively with respect thereto for supporting said auxiliary valve on said clapper.

3. An alarm check valve comprising a casing having inlet and outlet passages, a main valve clapper pivotally supported therein, an auxiliary valve laterally disposed with respect to the main valve and having a clapper cooperative with a valve seat operatively rigid with the casing, and means for supporting said auxiliary valve on said main clapper and arranged to permit adjustment of said auxiliary valve longitudinally of and transversely to a line parallel to a diameter of said main clapper.

4. An alarm check valve comprising a casing having inlet and outlet passages, a main valve clapper pivotally supported therein, an auxiliary valve laterally disposed with respect to the main valve and having a clapper cooperative with a valve seat operatively rigid with the casing, and means for supporting said auxiliary valve on said main clapper and arranged to permit movement of said auxiliary valve in four different directions with respect to the main clapper to effect initial alignment of said valve with its seat.

5. The combination in an alarm check valve comprising a casing, a main valve seat, a main valve clapper cooperative with the seat, an auxiliary valve seat and an auxiliary valve having a clapper cooperative therewith, of means for supporting said auxiliary valve from said main clapper and arranged to permit initial adjustment for aligning said auxiliary clapper with its seat, said means comprising a member having a clevis and adjustable in two directions with respect to the main clapper and supported thereon, a pin extending through the jaws of said member and adjustable in two directions with respect thereto, and a housing supporting the auxiliary valve and carried on said pin.

6. The combination in an alarm check valve comprising a casing, a main valve seat, a main valve clapper cooperative with the seat, an auxiliary valve seat and an auxiliary valve having a clapper cooperative therewith, of means for supporting said auxiliary valve from said main clapper and arranged to permit initial adjustment for aligning said auxiliary clapper with its seat, said means comprising a lug on the main clapper, a member having a clevis and a threaded shank extending through said lug, lock nuts whereby said member may be secured to the lug, a pin extending through the jaws of said member, a housing carrying said auxiliary valve mounted on the pin, and means for adjusting said pin transversely of the clevis and securing it in adjusted position.

7. The combination in an alarm check valve comprising a casing, a main valve seat, a main valve clapper cooperative with the seat, an auxiliary valve seat and an auxiliary valve having a clapper cooperative therewith, of means for supporting said auxiliary valve from said main clapper and arranged to permit initial adjustment for aligning said auxiliary clapper with its seat, said means comprising a lug on the main valve clapper, a member having a clevis at one end and a shank extending through said lug, means for securing said shank in longitudinally and rotatively adjusted position with respect to the lug, a pin extending transversely through said clevis, means for securing said pin in longitudinally and rotatively adjusted position with respect to the clevis, and a housing supported on said pin and carrying said auxiliary valve.

In witness whereof, I have hereunto set my hand this 24th day of March, 1922.

LEROY M. LEWIS.